(12) United States Patent
Izabel

(10) Patent No.: US 9,381,892 B2
(45) Date of Patent: Jul. 5, 2016

(54) HYDRAULIC CONNECTOR FOR A WINDSHIELD WIPER BLADE HAVING GUIDANCE BY A LONGITUDINAL ARM

(75) Inventor: Vincent Izabel, Chilly Mazarin (FR)

(73) Assignee: Valeo Systémes d'Essuyage, Le Mesail Saint Denis (FR)

( * ) Notice: Subject to any disclaimer, the term of this patent is extended or adjusted under 35 U.S.C. 154(b) by 212 days.

(21) Appl. No.: 13/989,859

(22) PCT Filed: Sep. 26, 2011

(86) PCT No.: PCT/EP2011/066676
§ 371 (c)(1),
(2), (4) Date: Jul. 23, 2013

(87) PCT Pub. No.: WO2012/072301
PCT Pub. Date: Jun. 7, 2012

(65) Prior Publication Data
US 2013/0291329 A1 Nov. 7, 2013

(30) Foreign Application Priority Data
Dec. 2, 2010 (FR) .................................... 10 04687

(51) Int. Cl.
*B60S 1/38* (2006.01)
*B60S 1/40* (2006.01)
*B60S 1/52* (2006.01)

(52) U.S. Cl.
CPC ................. *B60S 1/40* (2013.01); *B60S 1/3862* (2013.01); *B60S 1/4048* (2013.01); *B60S 1/524* (2013.01); *B60S 1/3805* (2013.01); *B60S 1/3806* (2013.01)

(58) Field of Classification Search
CPC ............................... B60S 1/3862; B60S 1/524

USPC ....................................................... 15/250.04
See application file for complete search history.

(56) References Cited

U.S. PATENT DOCUMENTS 8,381,348 B2 * 2/2013 Egner-Walter et al. ..... 15/250.04
2003/0009841 A1 * 1/2003 Sato .......................... 15/250.04

FOREIGN PATENT DOCUMENTS

| DE | 10 2007 062304 A1 | 6/2009 | |
| DE | 102008049269 A1 * | 4/2010 | ............... B60S 1/40 |
| JP | 2003-341484 A | 12/2003 | |
| WO | 2010/006775 A1 | 1/2010 | |
| WO | 2010/006776 A1 | 1/2010 | |
| WO | 2010/034447 A1 | 4/2010 | |
| WO | 2010034445 A1 | 4/2010 | |

OTHER PUBLICATIONS

International Search Report issued in PCT/EP2011/066676 mailed Oct. 19, 2011 (6 pages).

* cited by examiner

*Primary Examiner* — Monica Carter
*Assistant Examiner* — Andrew A Horton
(74) *Attorney, Agent, or Firm* — Osha Liang LLP

(57) ABSTRACT

The invention relates to a hydraulic connector for a wiper system, said wiper system also comprising a blade holder intended to move a blade over the surface to be wiped, a blade (3) and a mechanical connector (10) fixed to said blade in order to attach it to the blade holder, said hydraulic connector (30) having at least one line (31, 32) for supplying a liquid to the blade (3) via the mechanical connector (10). Said hydraulic connector is characterized in that it comprises at least one guide means (34) able to engage with a corresponding element (14) of the mechanical connector (10) in order to be aligned thereon while the blade (3) is being fitted on the blade holder.

13 Claims, 4 Drawing Sheets

HYDRAULIC CONNECTOR FOR A WINDSHIELD WIPER BLADE HAVING GUIDANCE BY A LONGITUDINAL ARM

The field of the present invention is that of equipment for vehicles, and more particularly that of equipment for wiping the windows of motor vehicles.

Motor vehicles are routinely fitted with windshield-wiper systems in order to wash the windshield and prevent the vision that the driver has of his environment from being disrupted. These windshield wipers are conventionally driven by a blade holder making an angular two-and-fro movement and comprising elongate blades, themselves supporters of scraper blades made of an elastic material. These scraper blades rub against the windshield and clear away the water taking it out of the field of vision of the driver. The blades are made in the form either, in a conventional version, of articulated spreader bars which hold the scraper blade in several discrete locations, or, in a more recent version called "flat blade", of a semi-rigid assembly which holds the scraper blade over its whole length. In this second solution, the blade is attached to the rotating blade holder of the windshield wiper by an assembly consisting of a mechanical connector and an adapter. The mechanical connector is a piece which is crimped directly onto the flat blade, while the adapter is an intermediate piece which allows the attachment of the connector to the blade holder of the windshield wiper. These two pieces are connected to one another by a transverse spindle which allows their relative rotation, in a plane perpendicular to the windshield passing through the blade holder.

The windshield wipers are also fitted with devices for carrying a windshield washer liquid which is conveyed from a reservoir situated on the vehicle and which is sprayed in the direction of the windshield by nozzles situated either around the windshield or on the windshield wiper itself for a better distribution of the liquid. In the case of nozzles placed on the blades, the windshield-washer liquid is conveyed, before being distributed between them, by pipes which are attached to the blade holder of the windshield wiper and which are connected to the distribution system of the blade at the mechanical connector by a rigid piece, called hydraulic connector. These pipes, which are usually flexible and two in number in order to clean both during the outbound and return journey of the blade, emerge in the hydraulic connector, which is attached to the mechanical connector by appropriate fittings and which provides the necessary seal with it. The mechanical connector therefore comprises orifices capable of receiving, by a sealed connection, said fittings of the hydraulic connector.

On models for top-of-the-range vehicles, there are also devices for heating the windshield in order to defrost the blade in the event of severe cold and to prevent it from sticking to the windshield under the action of the frost. These devices, which are more specially suited to flat blades, usually comprise a heating device incorporated into the assembly carrying the scraper blade and on which electrical resistors are placed. They also require an electrical connection device capable of interacting with the mechanical connector in order to transmit to the heating device the electrical current originating from the vehicle. The electrical connector is usually attached to the hydraulic connector before the latter is fitted to the mechanical connector in order to be attached thereto at the same time as it. Rapid connection devices then provide the contact between the pins of the electrical connector and those of the mechanical connector and ultimately the contact with the heating resistors of the assembly supporting the scraper blade.

Documents WO2010/034445 and WO2010/034447 show embodiments of mechanical connectors that receive a hydraulic connector through which the liquid of the windshield washer passes. They also show an electrical connector which supplies the mechanical connector with electricity.

While the pipes of liquid and the hydraulic connector are usually linked to the blade holder of the windshield wiper, the mechanical connector is linked to the blade and it is necessary to provide the connection of the hydraulic connector, and, if need be, of the electrical connector, to the mechanical connector when a blade is changed. This operation is usually carried out in a position called the position of service in which the blade is positioned relative to the blade holder so as to form an angle, by a rotation about the transverse spindle connecting the mechanical connector to the adapter.

It is necessary to make sure that the hydraulic and electrical connectors are correctly aligned during their installation in the mechanical connector, otherwise an incorrect assembly would result in a risk of leakage of windshield-washer liquid at the junction of the two connectors and/or a bad electrical contact. This operation is carried out blind, the hydraulic connector being situated beneath the top portion of the blade holder, which prevents good visibility of the pieces to be assembled.

In addition, during the uncoupling or removal of the blade from the blade holder, it is important that the hydraulic connector and, if need be, the electrical connector if it is attached thereto, remain attached to the blade holder. This prevents the hydraulic connector from being pulled by the mechanical connector in its separation movement from the blade holder of the windshield wiper. Furthermore, it is not acceptable to leave the hydraulic connector hanging under the terminal piece of the windshield wiper arm when the blade is removed.

Finally, during refitting, it is not conceivable to require the operator to hold in position the hydraulic connector with one of his hands while requiring him to refit the blade onto the arm with the other hand. Such a situation makes the fitting of the blade particularly difficult and not very ergonomic because the fitting of the blade on the arm already on its own requires the use of both hands, one of these hands being dedicated to the blade and the other to the windshield wiper.

It is therefore important to make the insertion and removal of the hydraulic connector from the mechanical connector easy and to ensure that the connection and disconnection are carried out correctly, even in the case of an inexperienced operator. The same applies to the electrical continuity to be ensured between the pins of the electrical connector and those of the mechanical connector.

The object of the present invention is to remedy these drawbacks by proposing a device making it possible to automatically guide the hydraulic connector during its insertion into the mechanical connector and to hold it in place on the blade holder during the removal of the blade. This guidance function may also provide the guidance of the electrical connector when the latter is first fitted onto the hydraulic connector.

Accordingly, the subject of the invention is a hydraulic connector of a wiper system, said wiper system also comprising a blade holder designed to move a blade over the surface to be wiped, a blade and a mechanical connector attached to the said blade for its attachment to the blade holder, said hydraulic connector comprising at least one pipe for carrying a liquid to the blade by means of the mechanical connector, characterized in that it comprises at least one guidance means capable of interacting with a corresponding element of the mechanical connector for its alignment on the latter, during the installation of the blade of the blade holder.

By virtue of this guidance means, the hydraulic connector automatically aligns its pipes with the orifices of the mechanical connector which they must enter, without the operator having to intervene for this alignment. This ensures a good securing of the connectors and a good seal between them according to a particularly easy application.

Advantageously, the guidance means is positioned laterally relative to the hydraulic connector. In other words, the guidance means is formed on the outside of one of the pipes.

The guidance means is an arm extending in a direction corresponding to a direction of extension of the said pipe.

In such a case, the element is a guidance ramp made on the mechanical connector, advantageously in a lateral face of the latter. This ramp is formed in the inner volume of the mechanical connector.

Alternatively, the guidance means is a guidance ramp extending in a direction corresponding to a direction of extension of said pipe. It can be understood that the hydraulic connector comprises a housing forming a ramp, this housing being made on the side of at least one of the pipes. This ramp comprises a bottom which thus extends in a plane perpendicular to a plane which passes through the central axes of the pipes.

In this alternative, the element is an arm made on the mechanical connector, advantageously originating from a lateral face of the latter. The arm thus forms a protuberance which protrudes from the mechanical connector.

Preferably, the hydraulic connector also comprises at least one supporting element capable of interacting with a supporting means attached to the blade holder while retaining at least one degree of freedom, the guidance means being arranged so as to allow the hydraulic connector to move according to this degree of freedom. The degree of freedom corresponds to the need to allow the hydraulic connector to move, for example in rotation, in order to be aligned with the mechanical connector.

Advantageously, the degree of freedom is a rotation and said supporting element consists of at least one trunnion or protuberance positioned laterally relative to the hydraulic connector and extending in a direction corresponding to a lateral direction relative to a direction of extension of said pipe.

In a preferred embodiment, the hydraulic connector comprises means for coupling an electrical connector, said means being capable of keeping the electrical connector aligned with the mechanical connector during the installation of the blade on the blade holder.

The invention also relates to a connection device of a wiper system comprising a terminal piece positioned at the end of a blade holder which extends in a longitudinal direction, a blade, a mechanical connector attached to said blade for its attachment to the blade holder by means of an adapter inserted between the terminal piece and the mechanical connector, characterized in that it comprises a hydraulic connector as described above.

In a particular embodiment, the connection device has a position of use and a position of service, the adapter comprising a means for immobilizing the hydraulic connector, in translation in the longitudinal direction, effective in the position of use. It will be noted that this immobilizing means holds the hydraulic connector in the mechanical connector while allowing a clearance between these two pieces that is necessary for the operation of the wiping system.

Advantageously, this immobilizing means is not effective in the position of service.

Also advantageously, said immobilizing means is a finger formed on a lateral wall of the adapter, said finger being capable of interacting with a protuberance extending laterally from the hydraulic connector.

Preferably, said protuberance consists of a trunnion.

In another particular embodiment, the connection device has a position of use and a position of service, the terminal piece comprising a supporting means, for supporting the hydraulic connector, effective in the position of service. In this embodiment of the invention, the means for supporting the hydraulic connector is not effective in the position of use.

It can therefore be understood that the immobilizing means and the supporting means are effective in antagonistic positions of the blade relative to the blade holder.

Advantageously, said supporting means consists of two pieces attached to the lateral faces of the terminal piece and each comprising, on their side internal to the terminal piece, a cavity capable of receiving a trunnion.

Preferably, said cavities have the shape of a keyhole formed so as to accommodate the trunnions in their cylindrical portion and to form a hard point during the passage of the trunnion from the cylindrical portion to the V-shaped portion.

The invention will be better understood and other objects, details, features and advantages of the latter will appear more clearly in the course of the detailed explanatory description that follows of an embodiment of the invention given as a purely illustrative and nonlimiting example, with reference to the appended schematic drawings.

Figure 4:
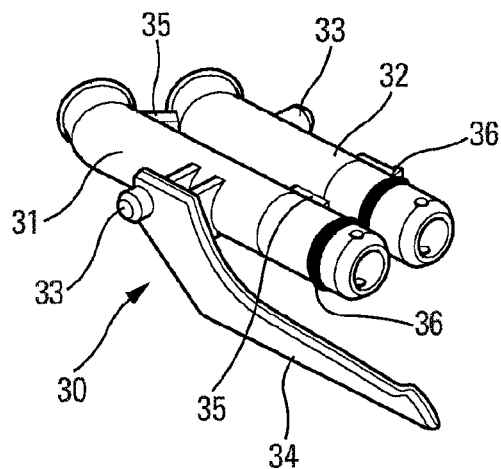
FIG. 4 is a view in perspective of a hydraulic connector according to one embodiment of the invention.
Figure 8:
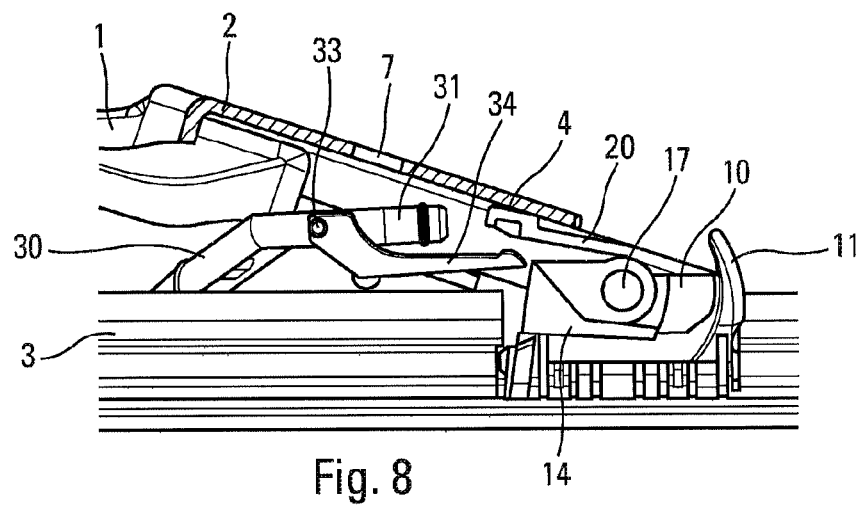
Figure 9:
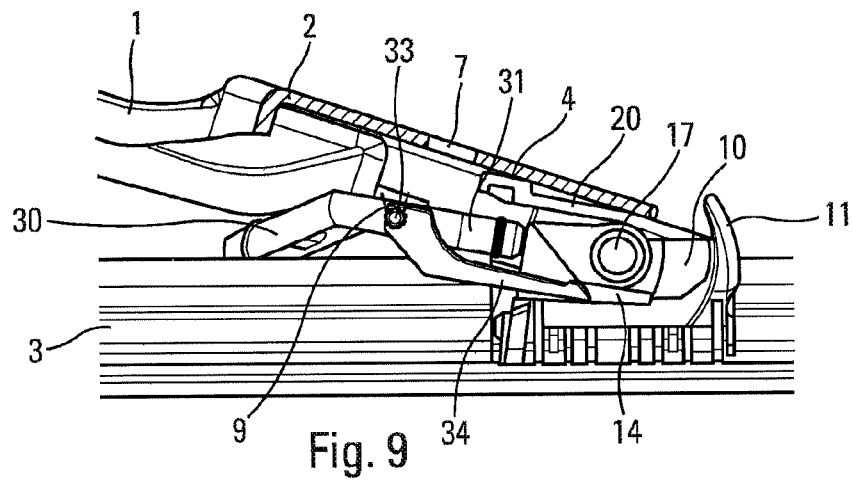
Figure 10:
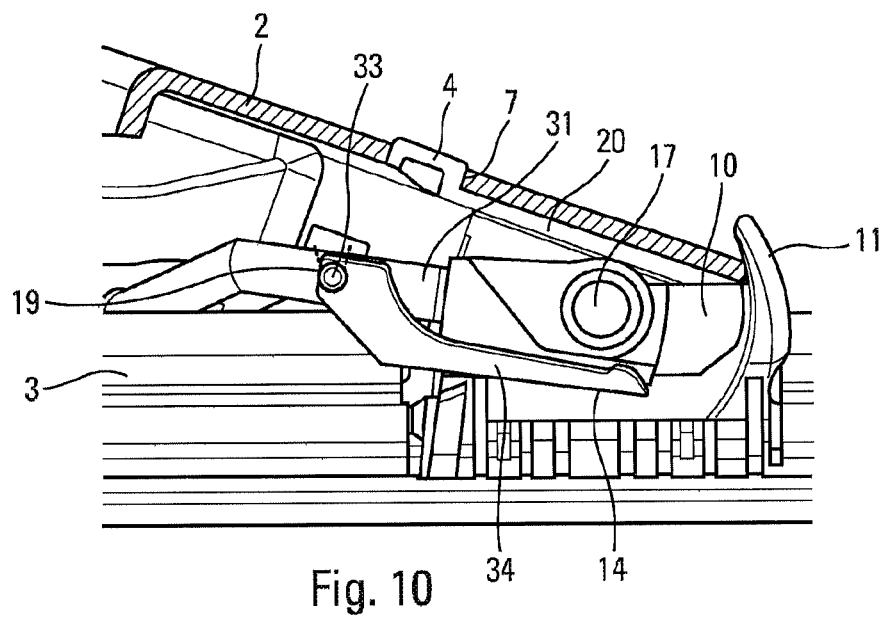
Figure 11:
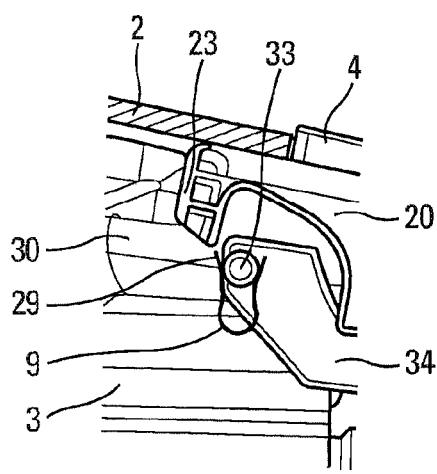
Figure 12:
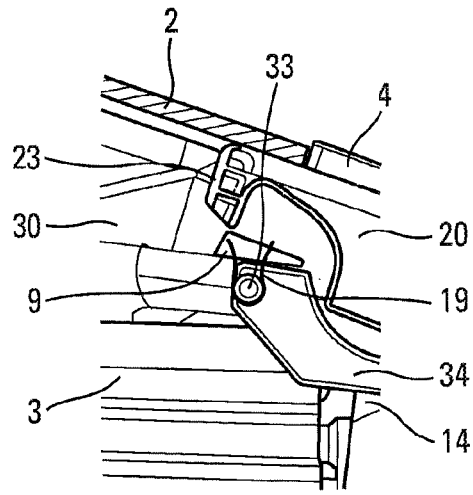
Figure 13:
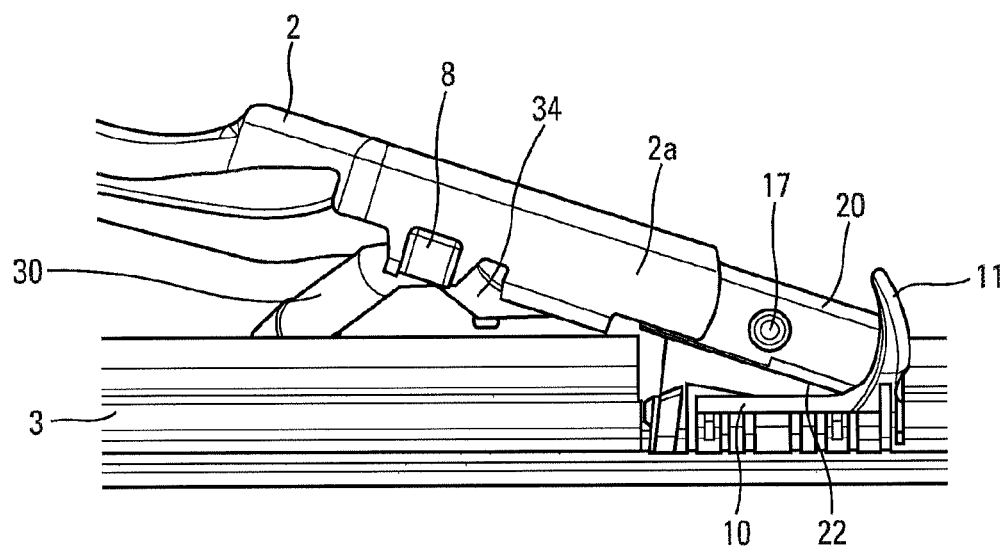

FIGS. 8 to 10 are views in sequence of a windshield wiper according to the invention, showing the installation or fitting of a connector of FIG. 4 to a mechanical connector, and FIGS. 11 to 13 are views in sequence of a windshield wiper according to the invention, showing the disassembly of the connector of FIG. 4 from a mechanical connector, during the withdrawal or removal of the blade of the windshield wiper.

It should be noted that the figures set out the invention in detail and that they may naturally be used to better define the invention if necessary.

In the rest of the description, the longitudinal or lateral denominations refer to the orientation of the blade holder to which the windshield wiper blade is fitted. The longitudinal direction corresponds to the main axis of the blade holder in which it extends while the lateral orientations correspond to straight lines which cross the longitudinal direction, notably perpendicular to the longitudinal axis of the blade holder in its plane of rotation. For the longitudinal directions, the outer and inner denominations are understood to be relative to the fastening point of the blade on the blade holder, the inner denomination corresponding to the portion in which the blade holder and a half-blade extend. Finally, the directions referenced as upper or lower correspond to orientations perpendicular to the plane of rotation of the blade holder, the lower denomination containing the plane of the windshield.

Figure 1:
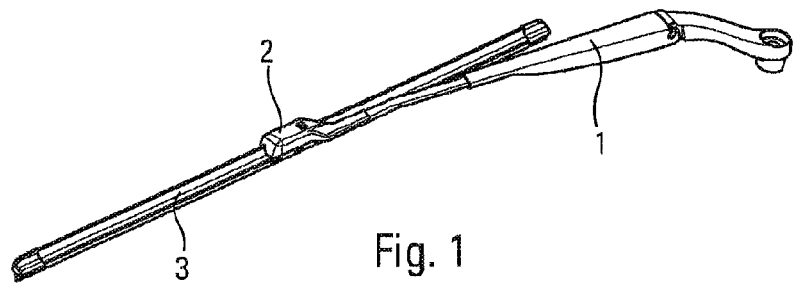
FIG. 1 is an overview, in perspective, of a wiping system for a window of a motor vehicle.
Figure 2:
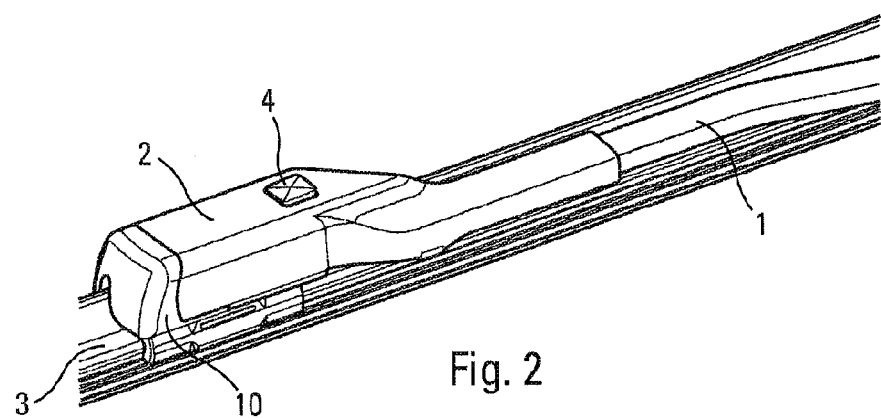
FIG. 2 is a detailed view of FIG. 1, showing the connection between the blade holder and the windshield wiper blade.

With reference to FIGS. 1 and 2, they show a wiper system consisting of an arm or blade holder 1 being extended at its outer end by a terminal piece 2 which is attached, on the inner side, by a crimping onto the blade holder 1. The terminal piece 2 covers an adapter 20 supporting the blade 3 by means of its mechanical connector 10. The adapter 20 is designed to be inserted into the terminal piece 2 by a translation movement along a longitudinal axis in order to come into the position of use where it is positioned in abutment against an interacting shape given to the terminal piece 2. It is then attached thereto reversibly by means of a retractable latching button 4 which interacts with a recess made for this purpose in the upper portion of the terminal piece.

Figure 3:
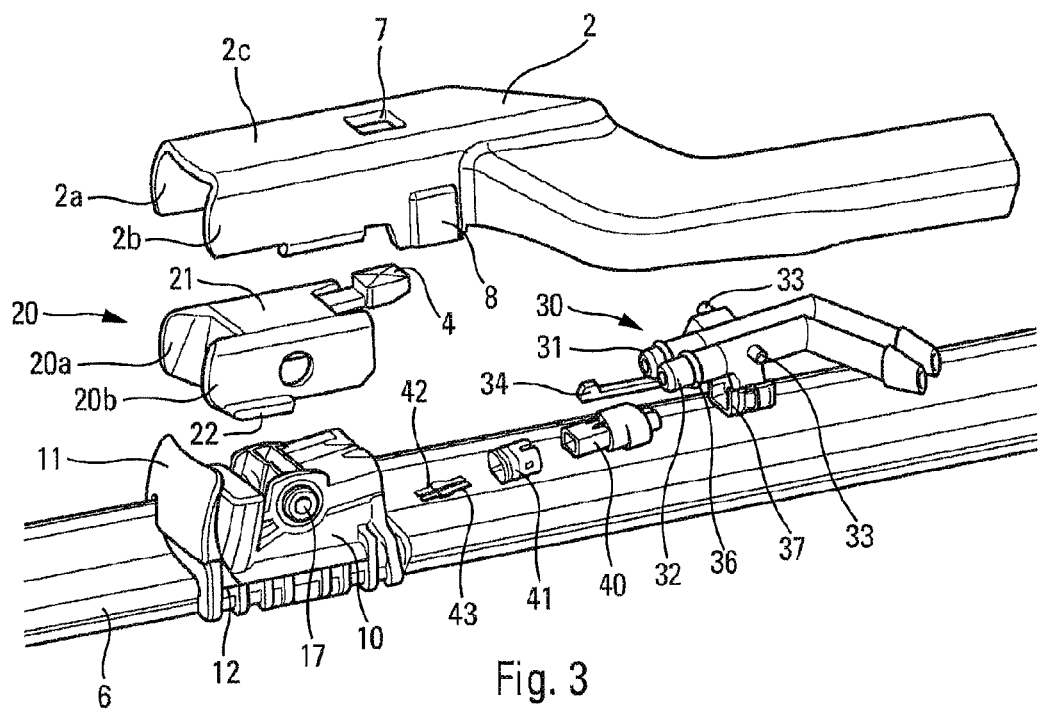
FIG. 3 is an exploded view of a windshield wiper comprising a hydraulic connector according to the invention.

With reference now to FIG. 3, it shows the detail of the elements for attaching the blade 3 to the blade holder 1.

The terminal piece 2 has an inverted "U" shape where the opening of this "U" shape faces the windshield. This terminal piece 2 comprises a base 2c at the upper portion and two lateral branches 2a and 2b extending in the direction of the glazing. Made on the base 2c is an orifice 7 in which the retractable latching button 4 of the adapter 20 is housed. The lower end face of each lateral branch comprises an edge folded at 90° in the direction of the inner volume defined by the base 2c and the branches 2a and 2b, the function of which is, on the one hand, to longitudinally guide the insertion of the adapter 20 and, on the other hand, to serve as an abutment in translation to corresponding abutments placed on the adapter 20. Attached to each lateral branch 2a and 2b of the terminal piece is a latching element 8 of which the function is to hold the hydraulic connector in translation during the withdrawal of the blade 3, which will be described in detail below.

The adapter 20 has the shape of a yoke, matching the inner volume of the terminal piece 2, so as to be housed in the latter. Two lateral walls 20a and 20b are joined by a bridge 21 and each comprise at their free ends a rim 22 folded toward the outside of the adapter. These rims 22 form a translation abutment when they come to rest against the folded edges of the lateral branches of the terminal piece 2. This adapter 20 also comprises two holes made through the lateral walls 20a and 20b and sharing the same axis designed to serve as an axis of rotation between the blade 3 and the blade holder 1 when the wiper system incorporating the hydraulic connector is assembled. Specifically, the blade must have at least one degree of freedom in rotation relative to the blade holder 1, and more specifically relative to the terminal piece 2, in order to allow the blade 3 to follow the curvature of the glazing element to be wiped.

The mechanical connector 10 is secured irremovably to the blade 3 so as thereby to transmit the mechanical force originating from the blade holder 1 to the blade 3. It has a substantially parallelepipedal shape extending in the axis of the blade, with two lateral flanks from which extend laterally two trunnions 17 of which the function is, on the one hand, to secure the mechanical connector to the adapter 20 and, on the other hand, to serve, by their interaction with the holes made in the lateral walls 20a and 20b of the adapter, as a spindle for the rotation of the blade 3 relative to the blade holder 1.

On the outside, the mechanical connector has a wall 11 called a cap which, in the first place, closes the front portion of the terminal piece 2 and acts as a screen to protect the components contained inside this terminal piece 2 and, in the second place, provides a well-crafted outer finish. The face opposite to the cap of the mechanical connector 10, called the inner face, comprises orifices (not visible) for hydraulic and electrical connection with the corresponding elements of the hydraulic connector 30 and of the electrical connector 40.

This inner face of the mechanical connector 10 comprises two hydraulic inlet orifices extended by inner distribution channels for the windshield washer liquid, which are designed to interact with the pipes 31 and 32 of the hydraulic connector 30 which provide it with liquid. These distribution channels (not shown in the figures) extend inside the mechanical connector 10 to emerge in line with the supply ducts 12 of the tubes 6 for the spraying of the liquid by the blade. As indicated above, these tubes extend along the two edges of the blade 3 in order to spray the windshield washer liquid on the outbound and return journeys of the blade.

The inner face of the mechanical connector also comprises orifices containing male pins 42 and 43 onto which female terminals supported by the mechanical connector 10 are fitted. This electrical connection provides the electrical power necessary to the operation of the heating element incorporated into the blade.

The hydraulic connector 30 takes the form of two pipes 31 and 32 positioned in parallel longitudinally and mechanically linked to one another by connecting bridges. As an example, when the pipe 31 or 32 forms a tube of cylindrical section, the direction of extension is formed by a centered straight line of the cylindrical section.

These pipes 31 and 32 each comprise sectors which extend in directions oriented angularly relative to one another, the junction between these sectors forming an elbow. Such a structure makes it possible to adapt the shape of the pipes 31 and 32 to the shape of the terminal piece 2 under which they are placed. On the inside, these pipes each comprise a spring-back or shoulder connector to which the flexible, windshield-washer-liquid supply tubes are fitted, which run along the blade holder 1 from the liquid reservoir.

On the outside, in other words on the side of the mechanical connector, each of the pipes 31 and 32 has a cylindrical shape capable of being inserted into the orifice of one of the inner distribution channels of the mechanical connector. O-rings 36 are placed close to this outer end in order to provide the seal between the pipes 31 and 32 and the orifices of the distribution channels which they enter.

At its lower portion, the hydraulic connector 30 comprises coupling means 37 designed to interact with corresponding supporting means on the electrical connector in the configuration in which the electrical connector is supported by the hydraulic connector and attached to it before the coupling of the assembly to the mechanical connector 10. As shown in FIG. 3, the coupling means 37 consist of a loop or an arch closing on the lower face of the hydraulic connector 30, in which the body of the electrical connector 40 is inserted. Means for immobilizing the electrical connector in longitudinal translation on the hydraulic connector 30 may also be used so as to prevent the withdrawal of the electrical connector after it has been put in place. It is quite clear that any other method of coupling the electrical connector 40 to the hydraulic connector 30, or even an absence of coupling, the latter then being carried out directly on the mechanical connector, may be envisaged without departing from the context of the invention.

Laterally, the hydraulic connector 30 comprises two protuberances 33 in the form of trunnions which are developed or extend from the pipes 31 and 32 to form a spindle of which the length is close to the width of the terminal piece 2, while remaining less than it in order to allow the movement of the hydraulic connector 30 in the inner portion of the terminal piece 2. These trunnions are formed by a tube of circular section which extends along an axis perpendicular to a direction of extension of the pipe on which the trunnion originates.

The hydraulic connector finally comprises, on at least one of the pipes 31, a guidance element 34 which extends laterally relative to the hydraulic connector 30 in the direction of the mechanical connector 10 with which it is intended to interact during the fitting of the blade 3 onto the blade holder 1.

As shown, the electrical connector 40 comprises a body which is inserted into the coupling means 37. The electrical connector also receives a sealing device 41 threaded onto the body. This sealing device 41 provides the sealing of the electrical connection between the electrical connector and the mechanical connector. The body 40 is pierced longitudinally with two hollow tubes in which metal connectors are positioned providing the electrical connection between the power supply wires (not shown) originating from the passenger compartment via the arm 1 and the male pins 42 and 43 which provide the electrical connection with the electrical circuit inside the mechanical connector 10 which passes through it to reach the heating resistors of the scraper blade.

With reference now to FIG. 4, it shows the detail of a hydraulic connector 30 according to an embodiment of the invention. The two pipes 31 and 32 are parallel and connected to one another by two securing bridges 35 so as to form a one-piece component. The two trunnions 33 are placed perpendicularly to two flats positioned on either side of the pipes 31 and 32 and having been molded together with the pipes. In general, each trunnion 33 emerges perpendicular from the pipe that supports it.

One of the flats is extended downward and forward so as to form a guidance arm 34 that is designed to be incorporated into a guidance ramp provided for this purpose and made in a lateral face of the mechanical connector 10. This guidance ramp thus forms the element made on the mechanical connector with which the guidance arm interacts.

Its length and its orientation are defined, with respect to this ramp, so that the pipes 31 and 32 are facing the channels internal to the mechanical connector for distributing the windshield washer liquid when the arm is incorporated into the ramp. As an example, the guidance arm 34 originates on the flat and extends in a direction that is inclined relative to a general direction of extension of the arm. In other words, the flat and the arm form an elbow relative to one another. It will also be noted that the free end of the arm protrudes from an outer end of the immediately adjacent pipe. The length of the arm is greater than the length of the pipe on which the arm originates. The free end of the arm also comprises a retention tooth, formed by a widening of the arm at the end of the latter. This tooth has at least one inclined ridge which makes the insertion of the arm into the ramp easier.

O-rings 36 are placed in a groove close to the outer end of each of the pipes 31 and 32 to ensure that they are sealed with the corresponding inner distribution channels of the mechanical connector.

Figure 5:
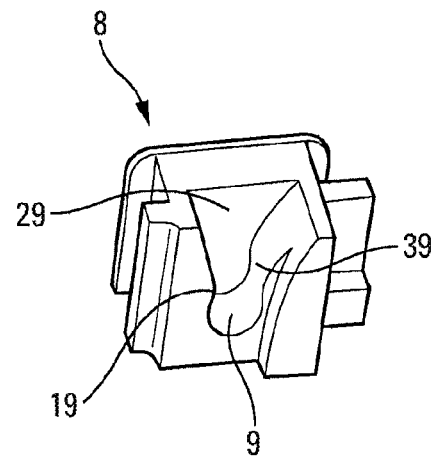
FIG. 5 is a view in perspective of a system for locking the connector of FIG. 4, during the removal of the blade.

FIG. 5 shows the detail of the latching element 8 seen from the inside of the terminal piece 2. It takes the form of a parallelepiped between an outer face and an inner face, the two faces being distant from one another at least by the thickness of a lateral face of the terminal piece 2. This latching means 8 comprises a cutout which protrudes longitudinally slightly from a lateral face of the parallelepiped. This cutout forms a slide in which is incorporated the thickness of the lateral face 2a or 2b onto which the latching element 8 is fitted. The parallelepiped is extended toward the inside of the terminal piece 2 by having a cavity 9 in a shape known as a keyhole shape. In other words, the section of the cavity forms an "Ω".

A lower portion 19 of said cavity has the hollow shape of a cylinder of revolution extending perpendicularly to the inner and outer faces of the parallelepiped, while the upper portion 29 tapers in a "V" shape. The two portions join together to form a bottleneck 39 having as its opening substantially the diameter of the trunnions 33 of the hydraulic connector 30. The purpose of this dimension is to create a hard point during the engagement of the trunnions 33 in the cylindrical portion 19 of the cavity 9 and thereafter to prevent an inadvertent departure of these trunnions once the mechanical connector has been placed in the position of service.

Figure 6:
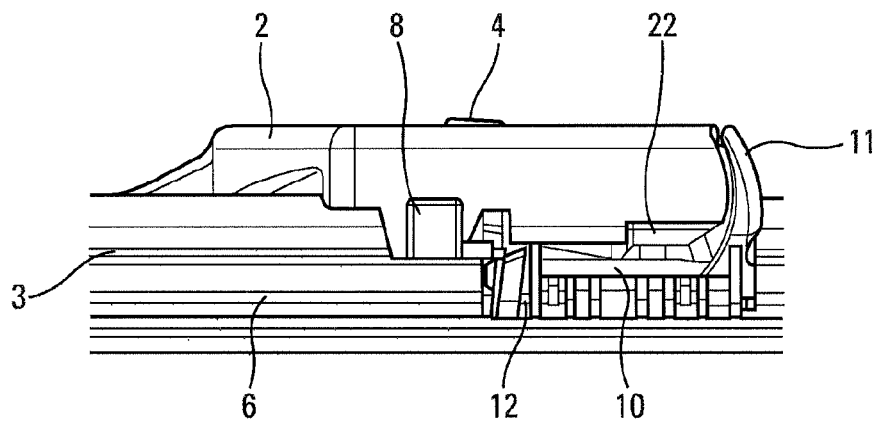
FIG. 6 is a side view of a connection of FIG. 2, the windshield wiper being in the position of use.
Figure 7:
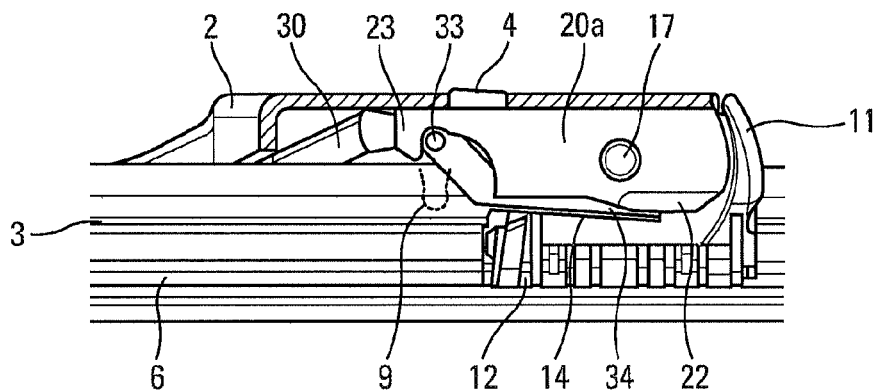
FIG. 7 is a view in partial section of the connection of FIG. 6.

With reference now to FIGS. 6 and 7, they show the blade 3 fitted to the blade holder, in the position of use, respectively in front view and in partial section, made on the terminal piece 2 so as to reveal the mechanical connector 10, the adapter 20 and the hydraulic connector 30.

In this position, the pipes 31 and 32 of the hydraulic connector 30 are in place in the inner distribution channels of the mechanical connector 10 and the guidance arm 34 is fully inserted into the guidance ramp 14 of the mechanical connector 10. The adapter 20 comprises, for its part, a means for immobilizing the hydraulic connector 30 in translation in the longitudinal direction which is effective in the position of use.

This immobilizing means takes the form of a finger 23 attached or formed at the inner end of the lateral face 20a of the adapter 20. The finger 23 is extended in the lower portion, that is to say in the direction of the windshield of the vehicle, to form a hook along said lateral face 20a. This finger, notably furnished with its hook, is capable of closing over the corresponding trunnion 33 in order to keep, in the position of use, the hydraulic connector 30 pressing against the mechanical connector 10. This makes the hydraulic connection and/or electrical connection between the hydraulic connector 30 and the mechanical connector 10 secure. It will however be noted that, in the position of use, the hook is at a slight distance from the trunnion 30 in order to ensure a clearance between the finger 23 and the trunnion 33. This clearance is necessary for the correct operation of the wiper system in the position of use.

FIG. 7 also shows, in thin line, the relative position that the cavity 9 has in relation to the trunnion 33, the latter being situated in the bottom portion because of the closure of the terminal piece 2 on the mechanical connector 10. It therefore does not interfere with the trunnion 33 of the hydraulic connector 30 which makes it possible to release any mechanical link between the hydraulic connector 30 and the terminal piece 2.

FIGS. 8 to 10 show, in sequence, the fitting of a hydraulic connector 30 according to the invention into a mechanical connector 10 having a suitable guidance ramp 14.

In the three figures, the blade holder 1 is placed in the position of service, that is to say that the longitudinal axis of the blade 3 forms an angle with the longitudinal axis of the blade holder to provide access to the mechanical connector 10 and to the adapter 20. The terminal piece 2 of the blade holder 1 and the adapter 20 are shown therein in section in order to reveal the hydraulic connector 30 and the mechanical connector 10. The hydraulic connector 30 is attached to the terminal piece 2, its trunnions 33 being positioned in the cylindrical portions 19 of the two latching elements 8 situated on either side of the terminal piece 2. In this situation, the hydraulic connector 30 is held by the terminal piece 2 of the blade holder 1.

The adapter 20 is shown, in FIG. 8, at the beginning of its movement for insertion into the inner volume of the terminal piece 2 while in FIGS. 9 and 10 it is respectively in the middle and then at the end of this movement. This movement illustrates the installation of the blade 3 on the blade holder 1.

FIG. 8 shows the guidance arm 34 of the hydraulic connector isolated, the connector being held by the latching element 8 and being free to rotate about an axis passing through at least one trunnion 33.

In FIG. 9, the guidance arm 34 has been engaged in the guidance ramp 14 that is present on the lateral face of the mechanical connector 10. The guidance arm has therefore made a rotation about the axis passing through the trunnion 33, in a vertical plane, in order to follow the orientation imposed by this ramp. It will be noted that this insertion of the arm 34 into the ramp 14 is made easier by the presence of a taper at the ramp. In other words, the guidance ramp 14 comprises an inlet sector which has a tapered section.

In the angular position illustrated in FIG. 9, the pipes 31 and 32 are aligned with the axis of the inner ducts for supplying the mechanical connector with liquid because the guidance arm 34 is now situated in a rectilinear sector of the guidance ramp. The latter is thus formed by a rectilinear sector which extends along an axis parallel to the direction in which the inner liquid supply duct or ducts of the mechanical connector 10 extends.

In FIG. 10, the adapter 20 is at the end of travel on the terminal piece 2. The guidance arm 34 is fully inserted into the guidance ramp 14 and the retractable latching button 4 is in place in the orifice 7. The insertion of the hydraulic connector is then completed, with the pipes 31 and 32 installed in the inner channels and their O-rings 36 providing the seal.

Similarly, FIGS. 11 to 13 show, in sequence, the removal of a hydraulic connector 30 according to the invention from the mechanical connector 10 to which it was fitted.

In FIG. 11, the blade 3 is, relative to the blade holder 1, in an intermediate position between the position of use and the position of service. This figure shows the descent of the trunnion 33 into the cavity 9 of the latching element 8, the latter still being in its upper portion 29 in the form of a V.

In FIG. 12, it is fully in its position of service and in FIG. 13, the mechanical connector 10 has come out of the terminal piece 2.

The descent of the trunnion 33, following the full opening of the angle between the blade 3 and the blade holder 1, is completed and the trunnion is positioned in the cylindrical portion 19 of the cavity 9. In this position, the hydraulic connector 30 is supported by the terminal piece 2, by means of the latching element 8. In parallel, the placing of the blade in the position of service has released the trunnion 33 from the finger 23 of the adapter 20, thus allowing the latter to slide in the longitudinal direction relative to the terminal piece 2.

FIG. 13 shows the end of the extraction and of the removal of the worn blade from the blade holder 1. Subsequent to a pull made on the blade 3, the adapter 20 has slid completely along the terminal piece 2 and is ready to be separated from the blade holder. The hydraulic connector 30 is, for its part, still attached to the terminal piece 2, by virtue, as indicated above, of its being supported by its trunnions 33 positioned in the cylindrical portions 19 of the latching elements placed on the two lateral faces 2a and 2b of the terminal piece.

The replacement of a blade on a blade holder of a wiper system comprising a hydraulic connector according to the invention, including the removal of the worn blade and its replacement with a new blade, will now be described.

The operator begins by placing the blade 3 in the position of service, by separating it at an angle of 5° and 25° from the direction of the blade holder 1. Doing so, he causes the trunnions 33 of the hydraulic connector 30 to enter the latching elements 8, notably the cylindrical portions 19 of the cavities 9 of the parallelepipeds attached to each of the two lateral faces 2a and 2b of the terminal piece. The hydraulic connector 30 is then held longitudinally in position by these latching elements, while retaining a freedom of movement in rotation about the axis supporting its trunnions.

This movement toward the position of service also causes the blade 3 to turn relative to the adapter 20 which remains aligned with the terminal piece 2 to which it is fitted. It thus releases the trunnion 33 in question from the finger 23 of the adapter 20, which allows a relative longitudinal movement or translation between the adapter 20, and consequently the mechanical connector 10 and the blade 3, and the terminal piece 2.

After having separated the adapter 20 from the terminal piece by pressing on the retractable latching button 4 in order to take it out of the orifice 7, the operator can slide the adapter 20 in the slides formed by the folded edges of the lateral faces 2a and 2b of the terminal piece 2, either by pulling on the adapter 20, or on the mechanical connector 10, until the complete separation of the blade 3 from the blade holder 1 is achieved.

The fitting of a new blade is carried out in the reverse direction, with, first of all, the opening of the adapter 20 in order to place it at an angle with the mechanical connector 10. The fitting continues with an alignment of the adapter 20 on the terminal piece 2 followed by its insertion into the inner volume of the terminal piece 2 until the rims 22 come against the abutments of the lateral faces 2a and 2b of the terminal piece.

During this translation maneuver, the mechanical connector 10 is moved progressively closer to the hydraulic connector 30 and the guidance arm 34 enters the guidance ramp 14 of the mechanical connector, this entry being made easier by the presence of the tapered sector. Gradually as the guidance arm is inserted into the ramp, it causes the hydraulic connector 30 to rotate about the axis passing through the trunnions 33 in order to bring it into an angular position in which the pipes 31 and 32 are aligned with the inner channels of the mechanical connector 10.

By continuing the action of pushing the mechanical connector 10 and the adapter 20 against the terminal piece 2, the pipes 31 and 32 are inserted into the inner channels of the mechanical connector and ensure the supply of windshield washer liquid to the spraying tubes 6 of the wiper 3.

Then, by reclosing the blade 3 against the blade holder 1, that is to say by passing from the position of service to that of use, the finger 23 of the adapter 20 immobilizes the trunnion 33 which ensures the longitudinal retention of the hydraulic connector 30 and its securing with the mechanical connector 10. There is therefore no reason to fear the disassembly of this hydraulic connection during use. In parallel, the closure of the blade 3 on the blade holder 1 and the descent of the adapter 20 against the mechanical connector causes the trunnion 33 to come out of the cavity 9 in which it was enclosed. The hydraulic connector is therefore no longer secured to the terminal piece 2 and can follow the relative movements of the mechanical connector relative to the blade holder during the wiping of the glazing element.

The invention has been described for a windshield wiper blade of the flat blade type with two spraying tubes 6, that is to say with two pipes on the hydraulic connector 30. It is quite clear that it could just as well be applied in the case of a hydraulic connector comprising only one pipe. Similarly the system of latching by a finger 23 positioned on the adapter and latching a trunnion 33 can be replaced by a tongue supported by the adapter and interacting with a bar positioned on the hydraulic connector. A device for unlatching this tongue must then be put in place to separate the hydraulic connector on arrival in the position of service.

The invention described above shows the arm 34 originating from the hydraulic connector which interacts with an element forming a ramp 14 made on the mechanical connector. It goes without saying that the invention also covers a converse situation in which the guidance means, for example the arm 34, is formed from the mechanical connector 10 in order to interact with a corresponding element, notably a ramp 14, formed on the hydraulic connector 30, for example on at least one of its lateral faces.

This last variant has a not inconsiderable advantage. Specifically, the hydraulic connector is a piece which remains on the vehicle throughout the service life of the latter. It is therefore not inevitably to be replaced on each change of the wiper blade as is the case with the mechanical connector. Thus, it is therefore advantageous to form the ramp on the hydraulic connector because this element is formed inside the volume delimited by the hydraulic connector. This prevents having a protuberance formed by the arm which protrudes beyond this volume and which risks being broken by the consecutive repetitive manipulations on fitting and removal of the wiper blade. Correlatively, it is advantageous to find this arm on the mechanical connector linked to the blade because this mechanical connector is replaced with each change of the blade. Therefore, the arm is new on each change of the blade which ensures a correct alignment of the hydraulic connector on the mechanical connector on each change of the blade.

The invention claimed is:

1. A connection device of a wiper system, comprising:
a terminal piece positioned at an end of a blade holder that extends in a longitudinal direction;
a blade connected to the blade holder;
a mechanical connector attached to the blade,
an adaptor configured to be disposed in between and in contact with the terminal piece and the mechanical connector; and
a hydraulic connector of the wiper system,
wherein the hydraulic connector comprises a pipe for carrying a liquid to the blade by the mechanical connector, and
wherein the hydraulic connector comprises a guidance member, distinct from the pipe, that is configured to align with and contact the mechanical connector, and wherein the guidance member is inserted into a guidance ramp of the mechanical connector.

2. The connection device as claimed in claim 1, wherein the guidance member is positioned laterally relative to the hydraulic connector.

3. The connection device as claimed in claim 1, wherein the guidance member is an arm extending in a direction corresponding to a direction of extension of the the pipe.

4. The connection device as claimed in claim 3, wherein the guidance member is configured to align with and contact a guidance ramp of the mechanical connector, the guidance ramp protruding from a lateral face of the mechanical connector.

5. The connection device as claimed in claim 1, wherein the guidance member is a guidance ramp extending in a direction corresponding to a direction of extension of the pipe.

6. The connection device as claimed in claim 5, wherein the guidance ramp protrudes from a lateral face of the mechanical connector.

7. The connection device as claimed in claim 1, further comprising a supporting element that is configured to contact a supporting member attached to the blade holder while retaining at least one degree of freedom, the guidance means being arranged so as to allow the hydraulic connector to move according to the at least one degree of freedom.

8. The connection device as claimed in claim 7, wherein the at least one degree of freedom is a rotation, wherein the supporting element comprises a trunnion positioned laterally relative to the hydraulic connector and extending in a direction corresponding to a lateral direction relative to a direction of extension of said pipe.

9. The connection device as claimed in claim 1, wherein the connection device has a position of use and a position of service, the adapter comprising a means for immobilizing the hydraulic connector, in translation in the longitudinal direction, effective in the position of use.

10. The connection device as claimed in claim 9, wherein said immobilization means is a finger formed on a lateral wall of the adapter, said finger configured to contact a protuberance extending laterally from the hydraulic connector.

11. The connection device as claimed in claim 10, wherein the protuberance comprises a trunnion.

12. The connection device as claimed claim 1, wherein the connection device has a position of use and a position of service, the terminal piece comprising a supporting means, for supporting the hydraulic connector, effective in the position of service.

13. The connection device as claimed in claim 12, wherein the hydraulic connector comprises a supporting element that is configured to contact the supporting means attached to the blade holder while retaining at least one degree of freedom, wherein the supporting means comprises two pieces attached to lateral faces of the terminal piece and each comprising, on their side internal to the terminal piece, a cavity that is configured to receive a trunnion.

\* \* \* \* \*